Feb. 19, 1952

F. E. OAKHILL 2,586,558

THREE COLOR TELEVISION SYSTEM

Filed Sept. 29, 1949

Inventor:
Frederic E. Oakhill
By: Slice & Slice
Attys

Patented Feb. 19, 1952

2,586,558

UNITED STATES PATENT OFFICE 2,586,558

THREE COLOR TELEVISION SYSTEM

Frederic E. Oakhill, Wilmette, Ill., assignor to Prismacolor Pictures, Inc., Chicago, Ill., a corporation of Illinois Application September 29, 1949, Serial No. 118,482

4 Claims. (Cl. 178—5.2)

The invention relates generally to the transmission and reception or reproduction of television pictures, and more particularly to the transmission and reproduction of colored television pictures.

The invention has among its objects the utilization of a method of production of such a system by means of which colored television pictures may be produced employing substantially the present day type of transmission and receiving equipment, and utilizing only a single carrier transmitting channel.

Another object of the invention is the production of a system for reproducing colored television pictures in which the elements required for color transmission and reception may be merely added to present equipment, which may be readily utilized for the standard black and white transmission and in which the colors are faithfully reproduced, and if desired, the reproduced image may possess additional light so that the image may be enlarged to a relatively considerable degree.

Many other objects and advantages of the method and construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters indicate like or corresponding parts:

Figures 1, 2, 3, 4:
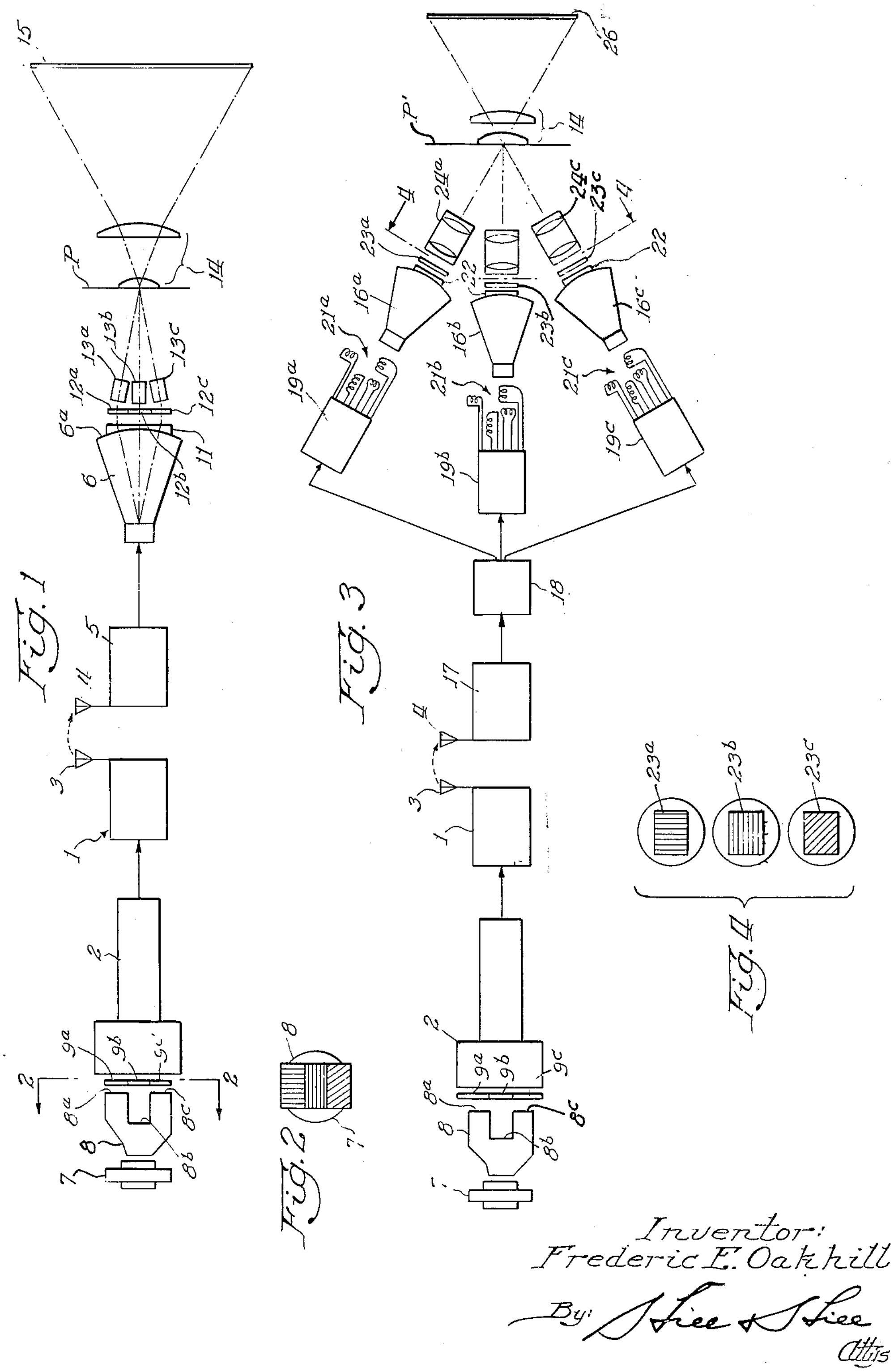
Fig. 1 is a diagrammatic view of a television system embodying the present invention.
Fig. 2 is a diagrammatic and elevational view of the lens and filter assembly taken approximately on the line 2—2 of Fig. 1 employed in the transmitter.
Fig. 3 is a diagrammatic figure similar to Fig. 1 of a modified form of the invention.
Fig. 4 is a diagrammatic and elevational view of the receiving image producing tubes taken approximately on the line 4—4 of Fig. 3.

The present invention contemplates the dividing of the rays of light forming the image to be transmitted into three separate paths, with the light in each path passing through a suitable color filter, after which it is received upon the transmission or scanning tube of the television transmitter. The scanning tube thus picks up three separate, individual images instead of one single black and white image, and the three images are therefore transmitted by means of radio waves on a single carrier, with the three images, in effect, each forming one portion of what might be considered the single picture being broadcast. The single carrier is then received in the receiving equipment in the usual manner, and the transmitted picture reproduced in the image reproducing means of the receiver, the picture so reproduced constituting the original three separate images. The light composing each reproduced image is then passed through suitable color filters and, by means of a suitable lens system, the three images are focused and superimposed upon each other to form a single image in color corresponding to the original image transmitted, a suitable enlarging optical system being employed, if desired, to produce an enlarged image which may then be projected upon a suitable viewing screen.

Referring to the drawings, and particularly to Fig. 1, 1 indicates diagrammatically a television transmitter of the type now in use which receives electrical impulses to be transmitted from a transmission or scanning tube 2, upon which is focused the image to be transmitted, converting the same into electrical impulses, including vertical and horizontal synchronization, which are subsequently modulated upon a radio carrier wave and transmitted into space by means of a suitable antenna structure 3. The carrier is picked up by the antenna 4 of the receiver 5, and the modulating impulses representing the transmitted image, after suitable amplification and synchronization, etc., are applied to a suitable reproducing or picture tube 6, which changes such impulses into light, thus reproducing the transmitted image. The transmitting and receiving mechanism thus far described may be of any suitable type such as is currently in use, and the details of construction thereof form no part of the present invention.

Positioned ahead of the orithicon or iconoscope tube 2 and acting upon light prior to its entry into the tube is a suitable lens structure 7 and prism assembly 8, the lens structure 7 being so designed that light from the image to be transmitted is operatively focused on the prism assembly 8.

The prism assembly 8 is operative to divide the incoming light from the lens 7 into three separate paths; light in one path leaving the prism assembly at the surface 8a, light in a second path leaving the prism from the surface 8b, and light in the third path leaving the prism from the surface 8c. The prism 8 may employ any suitable construction to achieve the desired results, one construction being illustrated in Patent No.

2,096,425, issued on October 19, 1937 to C. L. Dixon et al.

Interposed between the surfaces 8a, 8b, and 8c of the prism assembly 8 and the tube 2 are three color filters 9a, 9b, and 9c, and for example, the filter 9a opposite the surface 8a of the prism assembly may be red, filter 9b opposite the surface 8b may be blue, and filter 9c opposite the surface 8c may be green, whereby three separate images will be picked up by the scanning tube 2, with each of the images scanned representing the relative red, blue or green color values in the gray scale of the original image to be transmitted. It will be apparent that the three individual images, in effect, constitute one picture corresponding to the single black and white picture transmitted with the present equipment. The scanned picture comprising the three individual images is then transmitted by means of a modulated carrier wave, which is capable of being received by the antenna 4 and acted upon by the receiver 5, the output of which is fed into suitable image producing means, such as the tube 6, which may be of the standard type of picture tube now employed in the reception of black and white pictures. The picture reproduced by the tube 6 will comprise three separate images corresponding to the three images transmitted, and as some picture tubes presently being used are provided with a convex viewing surface 6a, positioned adjacent such surface is a suitable lens 11 which will compensate for the curvature of the tube surface 6a to produce three planar images (however, the use of a flat faced picture tube will simplify the optical system), which are then passed through respective filters 12a, 12b, and 12c, each image passing through a filter of the same color originally used in connection with the transmission of such image, after which the light comprising each of the images is passed through suitable lens structures 13a, 13b, and 13c operative to focus and superimpose the three images in a common plane P to form a single image in color which could be viewed at such point upon a suitable screen lying in the planar P, or by the use of a suitable optical enlarging system, indicated generally by the numeral 14, the image could be enlarged and projected upon a larger screen 15. The screen 15 may be either of the ground glass type, in which the image would appear on the opposite side thereof, or of the opaque type and on the same side thereof at which the enlarging optical system is located, the picture tube being accordingly connected in the receiver output circuit.

It will be noted that in this construction the only additional elements over that employed in the conventional black and white system is the prism assembly 8, filters 9, lens 11, filters 12, and lens structures 13, so that the transmission and reception of colored pictures by means of the present system could readily be obtained by the use of present transmitting and receiving equipment without change other than the incorporation of the additional elements above described.

In the embodiment of the invention illustrated in Figs. 3 and 4, the same transmitting equipment is employed with the modifications being embodied in the image reproducing section of the receiver.

In this construction, three individual image reproducing tubes 16a, 16b, and 16c are employed, and the initial signal received by the receiver is first acted upon by a suitable amplifier and other components of the receiver, indicated generally by the numeral 17. The electrical impulses then pass to a suitable master control 18, comparable to the controls on the average television receiver, such as light intensity, contrast, vertical and horizontal picture controls. The impulses pass from the master control 18 to individual control elements, indicated generally by the numerals 19a, 19b, and 19c, which may also include individual amplifying equipment to compensate for the division of the impulses into three separate channels. Each of the control units 19 may comprise all or a part of the controls embodied in the control unit 18. The output from each of the control units 19, is in turn operatively fed to the respective tubes 16a, 16b, and 16c, and assuming that magnetic deflection is employed, suitable deflecting coils or yokes may be employed for this purpose, the coils for the tube 16a being indicated by the numeral 21a, those for the tube 16b by the numeral 21b, and those for the tube 16c by the numeral 21c.

The magnetic field strength of the deflecting coils for any one of the tubes determines the deflection of the electro-magnetic beam in the tube which produces the image, and the characteristics of the coil may be so determined that in connection with predetermined operating voltages, the image produced will be of a given size and in a given position on the screen. Utilizing the usual methods of determining the physical characteristics of the respective deflecting coils to achieve any desired results, the coils 21a may be so designed that, in conjunction with the particular voltages employed, only the image passing through the filter 9a will be reproduced on the viewing surface of the tube 16a, such image, however, being any desired size up to the maximum limits of the tube, and in like manner, the coils 21b are suitably designed whereby only the image passing through the filter 9b of the transmitter will be reproduced in the tube 16b, and similarly, only the image passing through the filter 9c will be produced in the tube 16c, all of the images, however, being of similar size, as clearly illustrated in Fig. 4, and preferably of the maximum practical size capable of being reproduced by the respective tubes. Associated with each of the tubes 16 is a suitable flattening lens 22 operative to produce a planar image, and light from each of the lenses 22 is then passed through a respective filter 23a, 23b, and 23c respectively, corresponding in color to the filters 9a, 9b, and 9c. The light waves from the tubes, after passing through the filters, are passed through respective lens structures 24a, 24b, and 24c operative to focus and superimpose the images from the three tubes in a common plane P', the single image produced being in color and may be of the same size as a directly viewed black and white image on any one of the tubes 16. The image in the plane P' may then be enlarged by a suitably optical enlarging system 25 corresponding to the optical system 14, whereby an enlarged image is projected upon the screen 26.

The utilization of individual picture tubes for each color, and individual control units for each tube permits individual control of the reproduction of each color in the final picture, and the control units 19 may be of the type and so located on the receiver chassis that adjustment may be factory set, if desired, and only the master controls operated by the user. Likewise, as the light for each color is derived from a separate tube, it will be apparent that, employing tubes of the same size and characteristics, approximately three times the amount of light is obtained from the construction illustrated in Fig. 3 than that illustrated in Fig. 1, which permits enlarging of the final image to a considerably greater size.

To achieve greater definition in the reproducing color image, the time of the scanning sweep employed in the operation of the orithicon or transmitting tube is preferably increased beyond that normally employed for a black and white picture.

It will be noted from the above description that the present invention involves a method and system for producing television pictures in full color, which is relatively simple and in which substantially only relatively simple changes or additions are required in equipment utilizing the present invention. Consequently, color receivers could readily be constructed for reproduction of black and white, as well as colored pictures.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a television transmitting and reproduction system, the combination of a transmitter including an orithicon or iconoscope transmitting or scanning tube, means for projecting a plurality of images, each representing a respective color value of a single colored image which is to be transmitted on the scanning tube of said transmitter, whereby separate images in the gray scale are simultaneously transmitted from said transmitter, a television receiver including means having a convex viewing surface for reproducing the televised images, concave lens means associated with the convex viewing surface of said last mentioned reproducing means for rendering each of said images planar, a filter for each of said images corresponding in color to the color value of the respective images transmitted, a viewing screen, and lens means for each reproduced image, said last mentioned lens means being operative to focus the respective images in super-position upon said screen, forming a single composite image in color.

2. In a television transmission and reproduction system, the combination of a transmitter including an orithicon or iconoscope transmitting or scanning tube, a prism assembly interposed in the path of light forming the image to be scanned operative to divide such light into three separate paths, a lens structure positioned ahead of such assembly for focusing the initial light into such assembly, a respective color filter interposed in each light path leaving said assembly, the scanning tube of said transmitter being positioned to receive light from each of said paths, whereby three individual images are simultaneously transmitted from said transmitter, a television receiver including means for reproducing the three televised images, lens means associated with said last mentioned reproducing means for rendering each of said images planar, a filter for each of said images corresponding in color to the filters employed with the respective images in the transmission thereof, a viewing screen, and lens means for each reproduced image operative to superimpose and focus the respective images upon said screen, forming a single composite image in color.

3. In a television transmission and reproduction system, the combination of a transmitter including an orithicon or iconoscope transmitting or scanning tube, a prism assembly interposed in the path of light forming the image to be scanned operative to divide such light into a plurality of separate paths, a lens structure positioned ahead of such assembly for focusing the initial light into such assembly, a respective color filter interposed in each light path leaving said assembly, the scanning tube of said transmitter being positioned to receive light from each of said paths, whereby a plurality of individual images are simultaneously transmitted from said transmitter, a television receiver including means for reproducing the televised images, lens means associated with said last mentioned reproducing means for rendering each of said images planar, a filter for each of said images corresponding in color to the filters employed with the respective images in the transmission thereof, a viewing screen, and lens means for each reproduced image, said last mentioned lens means being operative to superimpose and focus the respective images upon said screen, forming a single composite image in color.

4. In a television transmission and reproduction system, the combination of a transmitter including a transmitting or scanning tube, a prism assembly interposed in the path of light forming the image to be scanned operative to divide such light into a plurality of separate paths, a lens structure positioned ahead of such assembly for focusing the initial light into such assembly, a respective color filter interposed in each light path leaving said assembly, the scanning tube of said transmitter being positioned to receive light from each of said paths, whereby a plurality of individual images are simultaneously transmitted from said transmitter, a television receiver including separate picture tubes for respectively reproducing each of the individual televised images, means for individually controlling the operation of each picture tube, lens means associated with each separate picture tube for rendering each of said images planar, a filter for each of said images corresponding in color to the filters employed with the respective images in the transmission thereof, a viewing screen, and lens means for each picture tube, said last mentioned lens means being operative to superimpose and focus the respective images upon said screen, forming a single composite image in color.

FREDERIC E. OAKHILL.

REFERENCES CITED

The following references are of record in the file of this patent:

UNITED STATES PATENTS

| Number | Name | Date |
|---|---|---|
| 2,200,285 | Lorenzen | May 14, 1940 |
| 2,294,820 | Wilson | Sept. 1, 1942 |
| 2,335,180 | Goldsmith | Nov. 23, 1943 |
| 2,337,980 | Du Mont | Dec. 28, 1943 |
| 2,389,646 | Sleeper | Nov. 27, 1945 |
| 2,465,652 | Legler | Mar. 29, 1949 |